United States Patent [19]

Garden

[11] Patent Number: 5,509,287
[45] Date of Patent: Apr. 23, 1996

[54] METHOD OF CONDITIONING THE SURFACE OF A SPLINE FORMING RACK

[75] Inventor: Dale J. Garden, Warren, Mich.

[73] Assignee: Anderson-Cook, Inc., Fraser, Mich.

[21] Appl. No.: 308,365

[22] Filed: Sep. 19, 1994

[51] Int. Cl.$^6$ .............................. B21H 5/00; B21D 37/20
[52] U.S. Cl. ................... 72/88; 72/469; 76/107.1
[58] Field of Search .................... 72/469, 88, 90; 76/107.1

[56] References Cited

U.S. PATENT DOCUMENTS

| | | | |
|---|---|---|---|
| 3,705,513 | 12/1972 | Daniel | 72/102 |
| 3,862,567 | 1/1975 | Hidreth | 72/469 |
| 3,889,516 | 6/1975 | Yankee | 72/469 |
| 3,910,091 | 10/1975 | Samanta | 72/256 |
| 3,913,365 | 10/1975 | Kruse | 72/104 |
| 4,058,999 | 11/1977 | Gabriele | 72/102 |
| 4,563,890 | 1/1986 | Dickson | 72/88 |
| 4,622,842 | 11/1986 | Bachrach et al. | 72/467 |
| 4,878,370 | 11/1989 | Fuhrman et al. | 72/264 |

FOREIGN PATENT DOCUMENTS 764806  9/1980  U.S.S.R. .................. 72/469

OTHER PUBLICATIONS

"Surf Alloy Brochure", Alloying Surfaces, Inc. 1984, U.S.A.
Rocklumizer Brochure, Rockline Mfg. Co. 1987, U.S.A.

Primary Examiner—Daniel C. Crane
Attorney, Agent, or Firm—Young & Basile

[57] ABSTRACT

A spline forming rack having a plurality of parallel teeth for the cold forming of a spline on a workpiece wherein the land surfaces of the teeth have deposited thereon by a welding process a layer of particles of a hardening material such as tungsten carbide to increase both the wear resistance and the roughness of the land surfaces.

8 Claims, 2 Drawing Sheets

METHOD OF CONDITIONING THE SURFACE OF A SPLINE FORMING RACK

FIELD OF THE INVENTION

The present invention relates to rack-type dies used to form splines on metal shafts and more particularly to a method of conditioning the working surfaces of such a rack to improve both the operating characteristics and the wear resistance thereof.

BACKGROUND OF THE INVENTION

A spline is a series of parallel, evenly spaced axially running grooves formed around the circumference of a cylindrical workpiece. A spline may, for example, be formed at the end of a shaft which is to be attached to a wheel or gear to transmit torque. The wheel or gear has an inner diameter formed with axially running teeth to mate with the spline teeth when the shaft is inserted into the inner diameter. The resulting connection between the two components permits the transmission of rotary force with zero possibility of slippage.

Splines are most commonly formed by a cold-working process wherein the cylindrical workpiece is rolled between a pair of parallel dies, called racks, which have teeth of the proper size and spacing to create the desired grooves in the workpiece. The workpiece is placed between the tooth-bearing surfaces of the two racks, pressure is applied perpendicular to the plane of the racks and they are then moved past each other in a stroke which causes the workpiece to make several revolutions between the toothed surfaces, the teeth plastically deforming the material of the workpiece to form grooves. On some racks, the teeth which contact the workpiece at the beginning of the stroke are very shallow in depth, successive teeth increasing in depth gradually along the length of the rack until reaching the full, desired depth. By "ramping up" the tooth depth in this fashion, material displacement is progressive and less instantaneous pressure is required. This splining process is described in detail in U.S. Pat. No. 3,982,415, the disclosure of which is incorporated herein by reference.

At the beginning of the spline forming stroke, the surface of the workpiece is smooth so that it is only the surface friction between the workpiece and the tops or lands of the teeth that causes the workpiece to roll as the racks are moved with respect to one another. To achieve high precision in the geometry of the spline being formed it is necessary that the workpiece roll between the racks in a precise and repeatable manner, i.e., there must be no slippage between the workpiece and the racks. A high coefficient of friction between the workpiece and the land surfaces of the teeth is therefore desired.

The teeth are formed on the racks by a grinding operation that leaves the teeth with a very smooth surface. According to the prior art, a sandblasting procedure is used to roughen the surfaces of the lands thereby to increase the coefficient of friction between the workpiece and the lands. Such sandblasting has two undesirable effects. First, the sandblasting cannot be practically confined only to the lands of the teeth, but rather abrades all of the tooth surfaces with a resulting degradation in the dimensional accuracy of the rack and hence the spline it is used to form. Second, sandblasting pits the surfaces of the teeth thereby weakening the metal and leading to more rapid wear and dulling of the racks during use, and consequently necessitating more frequent rack replacement.

SUMMARY OF THE INVENTION

The present invention provides a spline forming rack which achieves an increased degree of frictional engagement with the workpiece at the beginning of the spline forming stroke without sacrificing dimensional accuracy or wear resistance of the rack; i.e., the present invention actually increases wear performance and, therefore, results in an improved rack and rack product.

According to the invention a layer of particles of a wear resistant material is deposited such as by a welding process on only the lands of the teeth of the spline forming rack. This layer of particles bonds to the lands and creates a surface which is both rougher and more wear resistant than the tool steel of which the rack is made.

According to a further feature of the invention, the material deposited on the lands is either tungsten carbide or titanium carbide.

According to a still further feature of the invention, the particles deposited on the lands are sized so that when bonded to the lands, an irregular surface is produced having a peak-to-valley measurement in the approximate range at from 0.0005 to 0.0035 inches.

In a preferred embodiment of the present invention, an electrode used in a mechanical vapor diffusion process is held in a mechanically movable fixture and controlled to move in a pattern to deposit particles on only the lands of the rack teeth. This allows the precise application of the hardening material to the land surfaces only and thereby avoids any degradation of the dimensional accuracy of the rest of the tooth pattern.

DESCRIPTION OF THE PREFERRED EMBODIMENT

Figure 1:
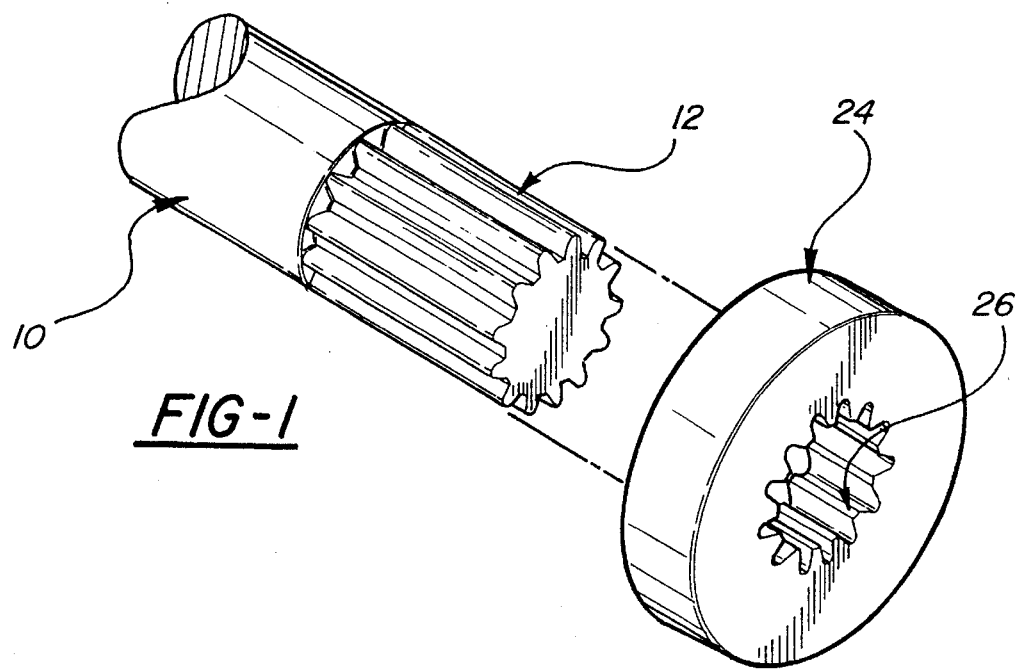
FIG. 1 is a perspective view of a workpiece with a spline formed at one end and a wheel with an inner bore shaped to engage the spline.

FIG. 1 shows a typical cylindrical workpiece 10 with a spline 12 at one end as formed by any known method. Workpiece 10 may be a shaft or axle used for the transmission of rotary motion with spline 12 ensuring a firm connection between workpiece 10 and a wheel 24 or the like by engaging an inner diameter 26 shaped with teeth which match spline 12.

Figure 2:
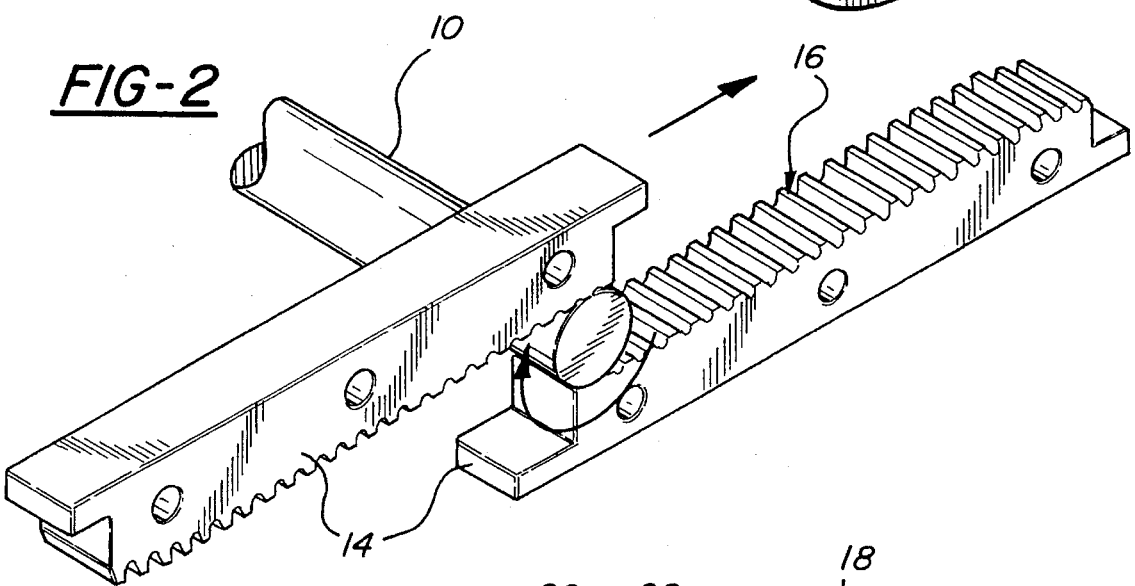
FIG. 2 is a perspective view of a pair of spline forming racks and a workpiece operatively positioned with respect to one another with arrows indicating the direction of movement during a spline forming stroke.

FIG. 2 shows the commonly used process of forming spline 12 on workpiece 10 by means of a pair of racks 14 which have a series of teeth 16 on their working surfaces. Racks 14 are arranged in an offset parallel relationship to trap workpiece 10 between their working surfaces as shown. During the spline-forming stroke, racks 14 are moved lengthwise with relation to each other so that workpiece 10 is forced to roll between them. Sufficient pressure is applied to racks 14 in the vertical plane as shown in FIG. 2 to cause teeth 16 to deform workpiece 10 at their point of contact therewith so that at the end of the spline-forming stroke, after workpiece 10 has undergone several full revolutions, spline 12 has been formed.

Figure 3:
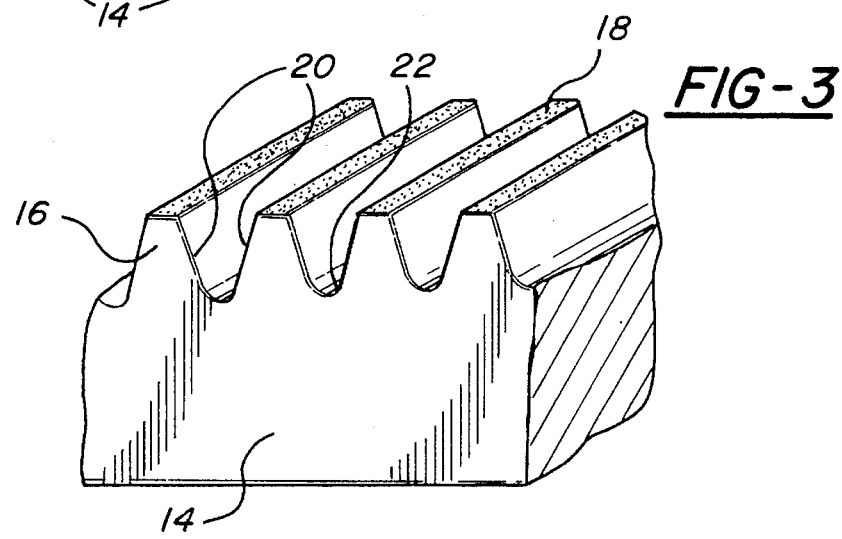
FIG. 3 is a detail of the tooth pattern of a spline forming rack treated in accordance with the present invention.

FIG. 3 shows a rack 14 with a typical tooth pattern in which teeth 16 have lands 18 at their tips. Flanks 20 drop away at a steep angle from lands 18 and adjacent teeth are separated at their bottoms by a root 22 which, depending on the shape of the spline 12 to be formed, may be either flat or rounded as shown.

Figure 4:
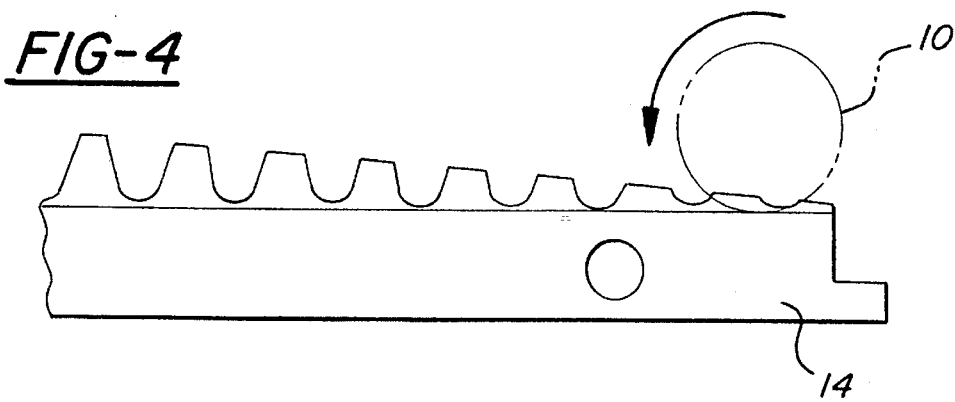
FIG. 4 is a side view of a portion of a progressive spline forming rack.

Depending upon the material properties of workpiece 10 and racks 14 and upon the shape of spline 12 to be formed, racks 14 may have a tooth pattern such as is shown in FIG. 4, in which the teeth which contact workpiece 10 at the beginning of the spline-forming stroke are very shallow in depth. The teeth progressively increase in depth along the length of racks 14 until the desired full depth of the spline is reached. This ramped tooth configuration leads to a more gradual rate of cold-working of workpiece 10 over the length of the stroke.

A layer of a hardening material 28 is deposited on the surfaces of lands 18 by means of a welding process wherein hardening material 28 and the material of rack 14 are heated and comingle to form an alloy of the two materials on the surfaces of lands 18. The preferred mechanical vapor diffusion process uses modulated electrical pulses to momentarily vaporize small particles of a consumable electrode 38 made of the hardening material as electrode 38 passes over rack 14. The vaporized particles join with and penetrate rack 14, which is also momentarily vaporized by the electrical pulses, and the hardening material diffuses into the rack material before they refreeze. Particles on the order of from 0.0001 inches to 0.0250 inches may be deposited by suitably controlling the amperage of the current used in the process. Equipment to perform the mechanical vapor diffusion process is produced by Alloying Surfaces, Inc. of Troy, Mich. and by Rockland Manufacturing Co. of Sioux City, Iowa.

Figure 5:
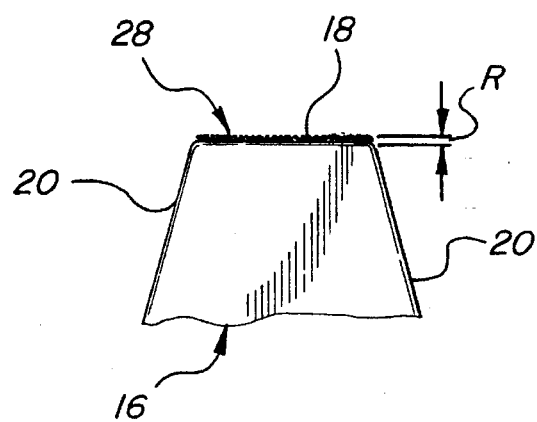
FIG. 5 is a high magnification view of a section of a land surface treated in accordance with the present invention.

In the preferred embodiment, either tungsten carbide (WC) or titanium carbide (TIC) is used as the hardening material and the particles are sized so that when they are bonded to the rack the resulting peak to valley distance R as shown in FIG. 5 measures approximately from 0.0015 inches to 0.0020 inches. Test production runs using racks treated in this manner have yielded splines that show no significant loss in dimensional accuracy due to slippage at the start of the spline-forming stroke. Racks treated as described above have demonstrated dramatic increases in durability; i.e., up to twice the useful life of prior art sandblasted racks.

All of lands 18 on racks 14 may be treated in this manner to increase their wear resistance and so extend the useful life of racks 14, however the roughening effect of the treatment is only necessary on lands 18 which contact workpiece 10 during its first one or two revolutions of the spline-forming stroke. After the first one or two revolutions, grooves have been formed in the surface of workpiece 10 that are of sufficient depth that teeth 16 will engage the grooves and so provide positive contact between the two regardless of surface roughness.

Figure 6:
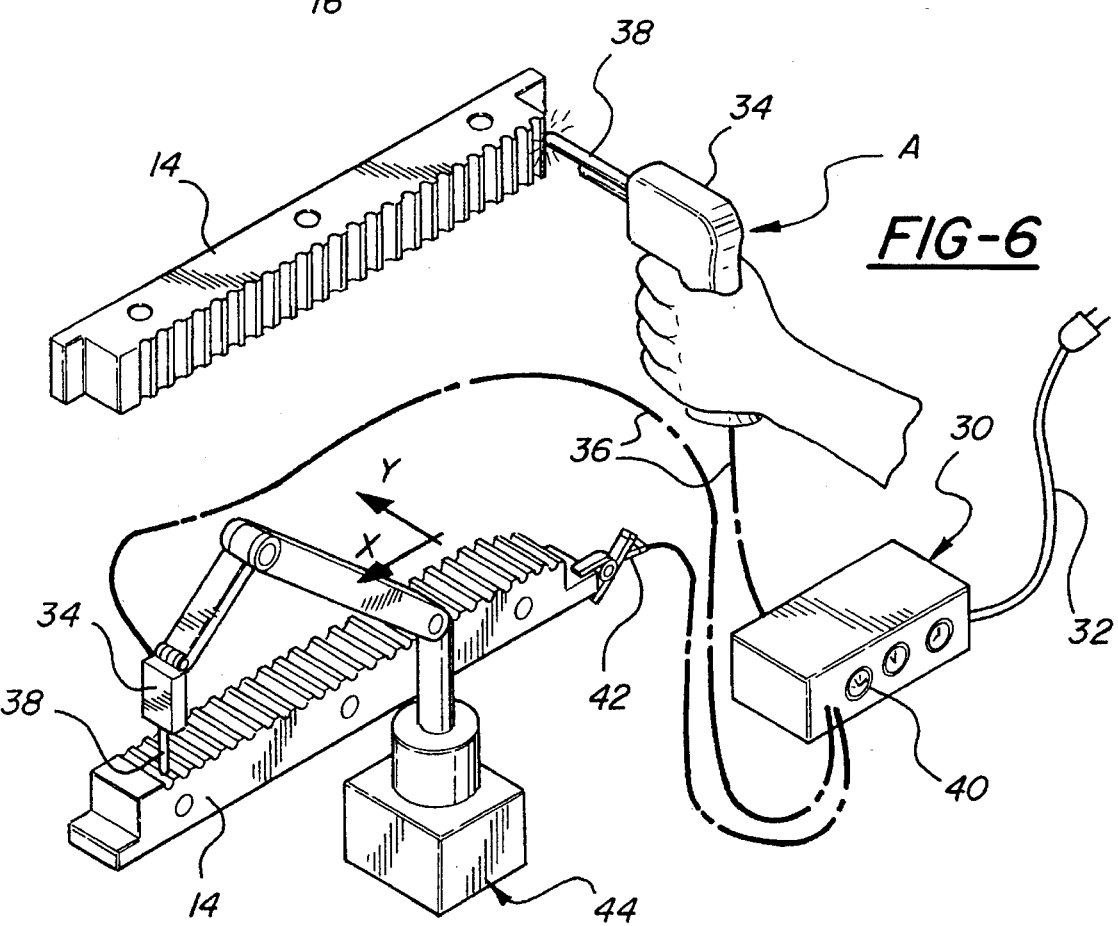
FIG. 6 is a perspective view of the apparatus used to produce a rack according to the present invention.

As seen in FIG. 6, the equipment used for the mechanical vapor diffusion process comprises a power supply/control unit 30 which plugs into a standard 110 volt electrical outlet by means of power cord 32, an electrode holder 34 connected by cable 36 to power unit 30, an electrode 38 made of the hardening material used in the process, and a ground clip 42 which is connected to the article to be treated. Any electrically conductive material may be used in electrode 38 but to achieve a high degree of wear resistance an alloy such as tungsten carbide or titanium carbide is preferred. Electrodes 38 are commercially available in a range of diameters form 0.020 inches to 0.1875 inches.

To apply the hardening material 28 to lands 18, ground clip 42 is attached to rack 14, and power unit 30 is plugged in and switched on. Electrode 38 is then brought sufficiently close to rack 14 to complete an electrical circuit and create an electrical arc between electrode 38 and rack 14. The resulting heat vaporizes both electrode 38 and a thin layer of the surface of rack 14. During the process, electrode holder 34 vibrates electrode 38 slightly in the plane normal to the axis of electrode 38 to prevent electrode 38 from sticking to rack 14 and to promote the transfer of particles of electrode 38 to rack 14. As electrode 38 is moved over the surface of rack 14, particles of the hardening material are deposited in a path of a width approximately equal to the diameter of electrode 38.

Power unit 30 is adjusted by means of a discharge selector knob 40 to supply current at the desired level to electrode 38. Varying the amount of current supplied to electrode 38 controls the size of the particles deposited on a surface during treating and so the resulting thickness and roughness of the layer. The precise relationship between power setting and the particle size achieved depends upon the material and hardness of rack 14.

Electrode holder 34 may be hand-held by an operator and moved manually over the surface to be treated, as indicated at A in FIG. 5, but in the preferred embodiment a fixture 44 holds rack 14 stationary and supports electrode holder 34 for mechanically controlled vibratory and progressive movement over the surface to be treated. Fixture 44 may be similar in configuration to any of the various types of equipment used in the machine tool industry for the machining of parts, such as a manually operated milling machine, a computer-numerically controlled (CNC) machine, or a robotic machining cell.

On racks 14 having a very fine pattern of teeth 16, lands 18 may be on the order of 1/16 inch or less in width. Racks such as this require a very precise control of the motion of electrode holder 34 to apply the hardening material to lands 18 without affecting any other portion of teeth 16. At the other extreme, a rack 14 used to form a more course spline may have teeth 16 with lands 18 wider than the largest available electrode 38. In this case, treatment of the entire width of a single land 18 requires multiple passes of electrode 38 along the length of land 18 (the Y axis as shown in FIG. 6), with electrode 38 being indexed along the X axis a distance approximately equal to the diameter of electrode 38 between each pass along the Y axis.

In view of the foregoing, it will be appreciated that drawings, description and disclosure contained herein are merely meant to illustrate particular embodiments of the present invention and are not meant to be limitations upon the practice thereof. It is the following claims, including all equivalents, which define the scope of the invention.

I claim:

1. A rack for roll-forming splines on an essentially cylindrical workpiece comprising:

a rack body having a working surface;

a plurality of parallel, spline-forming teeth on said working surface defined by alternating lands and roots connected by flanks;

the length of said working surface being sufficient to permit multiple revolution rolling engagement between the working surface and the workpiece during a continuous spline-forming stroke;

the teeth which engage the workpiece during the first full revolution of the stroke having deposited thereon a substantially uniform layer of particles of material of substantially greater hardness than the material of the rack, which particles project above the surface of the lands to make the treated lands substantially more rough than untreated lands; and the teeth which engage the workpiece during the last full revolution of the stroke being untreated but of greater depth than the treated teeth.

2. A rack as defined in claim 1 wherein the particle material is selected from the group which includes tungsten carbide and titanium carbide.

3. A rack as defined in claim 1 wherein the size of the particles is in the range of approximately 0.0015 inches to 0.0035 inches.

4. A rack as defined in claim 1 wherein the teeth which engage the workpiece during the first full revolution of the stroke are of progressively greater depth taken from the beginning of the first full revolution to the end of the first full revolution.

5. A method of manufacturing a rack for roll-forming splines on essentially cylindrical workpieces comprising the steps of:

providing a rack body having a working surface;

forming a plurality of parallel spline-forming teeth in said working surface; said teeth being of progressively increasing depth from one end of said working surface toward the opposite end of said working surface for a distance equal to at least one full revolution of contact between said working surface and the exterior surface of said workpiece; the balance of the teeth on said working surface being of substantially uniform depth; and, thereafter treating only the teeth of gradually increasing depth with a welding process to deposit thereon a layer of particles of material of greater hardness than the material of the rack to make the treated teeth substantially more rough than the untreated teeth for the purpose of enhancing the gripping friction between the teeth and the workpiece for at least the first full revolution of working contact therebetween.

6. The method defined in claim 5 wherein the particles deposited on the teeth is chosen from the group consisting of tungsten carbide and titanium carbide.

7. The method defined in claim 5 wherein the size of the particles is in the range from approximately 0.0015 inches to 0.0035 inches.

8. A method of manufacturing roll-formed splines on the exterior surface of a cylindrical workpiece comprising the steps of:

engaging the surface of the workpiece for at least one full revolution of contact with the teeth of a spline-forming tool; said teeth being of progressively increasing depth and having lands which are treated by deposit thereon of carbide particles thereby to substantially increase the roughness thereof; and, thereafter engaging the workpiece for at least one additional full revolution of working contact with a tool having spline-forming teeth of substantially uniform depth and relatively smooth, untreated land surfaces.

* * * * *